INVENTOR
Richard A. Montoro

United States Patent Office 3,397,438
Patented Aug. 20, 1968

3,397,438
CONTROL SYSTEM FOR METALLIC STRIP
GATHERING APPARATUS
Richard A. Montoro, Williamsville, N.Y., assignor to
Westinghouse Electric Corporation, Pittsburgh, Pa., a
corporation of Pennsylvania
Filed Feb. 11, 1966, Ser. No. 526,812
9 Claims. (Cl. 29—18)

ABSTRACT OF THE DISCLOSURE

A cutting tool is fed against the edge of a rotated metallic disc-like workpiece to produce strip which is wound under tension on a driven reel. The strip is formed by a physical process known as gathering which tends to cause strip gauge variation as certain system parameters vary during the strip forming operation. A control system responds to predetermined sensed variables and controls the reel drive to produce a constant gather ratio of strip speed to surface cutting speed and constant strip gauge.

Background of the invention

The present invention relates to control systems for metal working apparatus and more particularly to systems for controlling the operation of metallic strip gathering apparatus.

Metallic strip can be produced by several methods such as reduction rolling of stock metallic pieces. Another method which offers substantial production economy is a process most accurately known as metal gathering. In the metal gathering process, a stock metal workpiece of disc-like or other suitable form is secured on the spindle of a specially designed lathe and subjected to cutting tool force along its outer edge surface as it is rotated. The spindle is substantially fixedly supported by bearings to prevent bending movement of the spindle as a result of the cutting tool force, and metallic strip is formed as the cutting tool is driven to penetrate the rotating workpiece at a predetermined rate. Among other parameters, the operating results are affected by the metallurgical properties of the workpiece and by wear of the cutting tool. As the workpiece diameter decreases, variation in the spindle speed controls the surface cutting speed.

The metallic strip forming process is similar to a veneering process such as that employed to form a wood ply from a spinning workpiece of wood. However, the basic mechanics of the metallic strip forming process differ from the wood veneering process in that metallic material is formed into strips substantially by gathering or bunching action produced by pushing force in front of and outwardly of the cutting tool edge whereas the wood strip is formed substantially by tool edge cutting action between the wood workpiece and the wood ply product. The gathering effect is known to exist in metallic strip formation because cutting tool penetration differs materially from resulting strip product thickness. Thus, a continuing cutting tool penetration of 1 mil into the rotating workpiece edge may result in metallic strip product having variable gathered thickness, for example 1.8 to 3.5 mils, depending on the effects of certain system operating variables.

Strip product from the gathering lathe is transported under tension to a windup reel. The rate at which strip is coiled corresponds to the strip speed and depends primarily on the reel speed and the coil diameter buildup. To regulate the strip product for quality and uniformity, it is necessary that appropriate system operating variables be controlled.

Summary of the invention

In accordance with the broad principles of the present invention, a control system is arranged to operate metallic strip gathering apparatus including a lathe and a windup reel so as to produce uniformly high quality and highly accurate gauge strip. A spindle drive for the lathe is driven at controlled speed preferably to produce substantially constant workpiece surface cutting speed as a cutting tool is driven at a controlled feed rate against an edge of a workpiece or billet supported on the spindle. A reel drive is controlled preferably so as to control the strip tension as the strip product coil increases in diameter. As a further preference, the strip tension is controlled to result in a continuously and substantially constant gather ratio, i.e., the ratio of surface cutting speed to strip speed. The surface cutting speed is linearly proportional to the ratio of gathered strip thickness to the cutting tool penetration depth.

It is therefore an object of the invention to provide a novel control system which operates metallic strip gathering apparatus in a manner that makes the apparatus a feasible and highly economic and useful commercial factor of metallic strip production.

Another object of the invention is to provide a novel control system which operates metallic strip gathering apparatus to produce improved high quality strip product.

A further object of the invention is to provide a novel control system which operates metallic strip gathering apparatus to produce improved highly accurate gauge strip product.

These and other more detailed objects of the invention will become more apparent upon consideration of the following detailed description along with the attached drawings.

Description of the preferred embodiment

Figure 1:
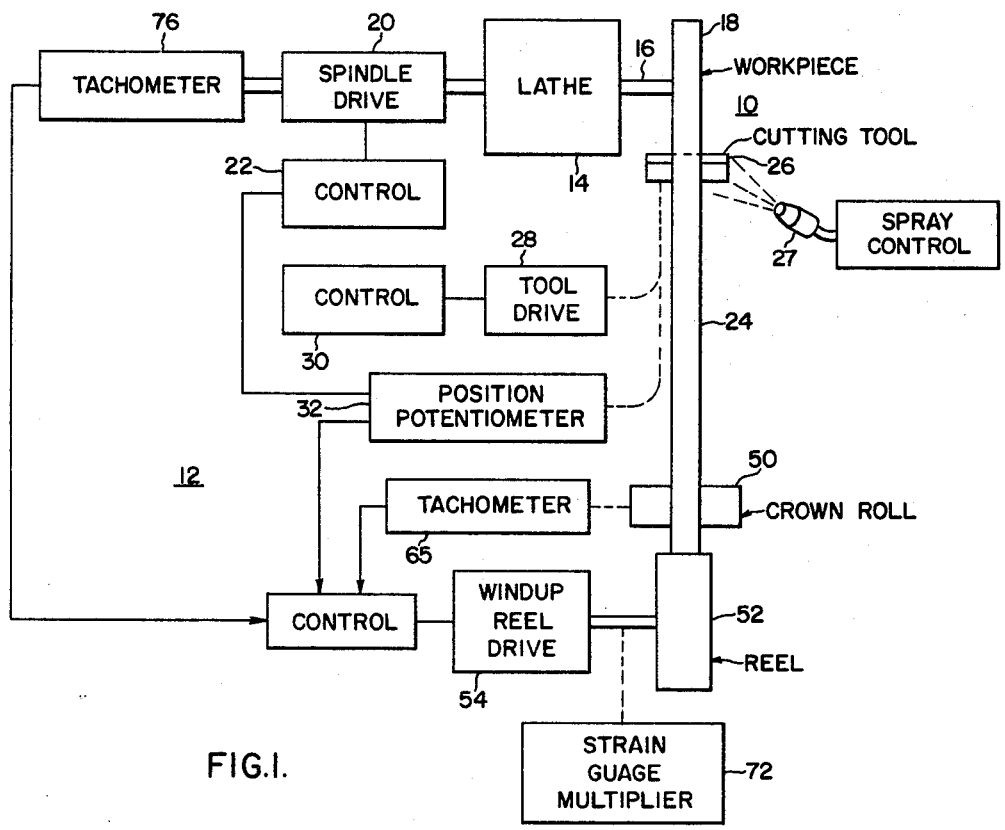
FIGURE 1 shows a schematic block diagram of metallic strip gathering apparatus and a control system arranged in accordance with the principles of the invention.

More specifically, there is shown in FIG. 1 metallic strip gathering apparatus 10 operated by a control system 12 which is arranged in accordance with the principles of the invention. The apparatus 10 includes a lathe 14 having a spindle 16 supported on suitable bearings (not shown). A workpiece or billet 18 preferably in the form of an unheated disc-like member is rigidly coupled to the spindle 16, for example by means of ratchet coupling arrangement (not shown) forming a part of the end of the spindle 16 and radially clamped against the billet 18 in an opening through the billet centerline. As an example of disc geometry, the billet 18 can have a width of 6 inches and an outer diameter of 24 inches and an inner diameter of 8 inches. The billet 18 can be formed from materials such as copper, brass, stainless steel or other metals or materials having gather characteristics as previously defined.

A spindle drive 20 is provided for rotating the billet 18 at a speed determined by a control 22. To peel strip 24 from the rotating billet 18, a cutting tool 26 is suitably disposed for penetration into the billet edge surface. The width of the tool 26 can be about equal to the width of the billet 18 or it can be wider as shown. A suitable tool drive 28, such as a geared in feed drive having a limited selection of feed rates or a motor operated feed screw, is operated by a control 30 and is mechanically connected to the tool 26 to drive the tool 26 into the billet 18 as the spindle 16 is rotated. The tool feed rate is preferably constant, for example 1 mil per spindle revolution. To assure quality strip product, the spindle bearing support prevents spindle side thrust or bending as a result of cutting tool force. Tool cooling is produced suitably, as by a controlled spray device 27. The rate of cooling has an effect on the strip forming process results, but any cooling rate variations is compensated by operation of the control system 12 as will subsequently become more apparent.

As previously indicated, the billet surface cutting speed is preferably held constant. Thus, the spindle drive 20 must increase in speed as the billet outer diameter decreases with continued strip formation. To control the surface cutting speed, a potentiometer 32 is linked with the cutting tool drive 28 or feed screw to produce a signal representing tool position in relation to a reference such as the spindle axial centerline. The control 22 responds to the output signal of the tool position potentiometer 32 to increase the spindle speed at a rate which results in maintaining constant surface cutting speed as the radial position of the tool 26 decreases.

The spindle drive 20 can be any suitable drive arrangement such as a rectiflow drive (not shown) having a power rating as great as 125 horsepower or more. The rectiflow drive comprises a DC motor armature and a three phase wound induction motor secondary mounted on a common shaft respectively in association with a DC stator field and a three phase AC stator primary winding. The wound secondary is connected through a rectifier circuit to the DC armature. High starting torque is produced by the rectiflow drive, and a substantially constant horsepower controlled speed range as great as 3 to 1 can be realized. The DC field strength is varied to regulate the rectiflow torque and speed.

Figure 2:
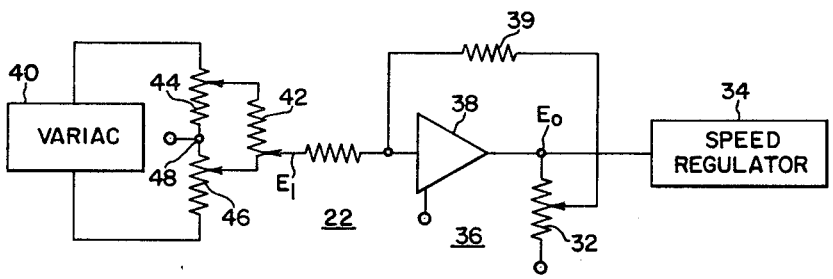
FIG. 2 shows a schematic diagram of a spindle drive control employed in the system of FIG. 1.

As shown in FIG. 2, the control 22 for the spindle drive 20, when embodied as a rectiflow unit, can include a speed regulator 34 to which a control voltage $E_0$ is applied by a multiplier circuit 36. In the multiplier 36, a standard DC amplifier 38 produces the voltage $E_0$ as a multiple of an input speed reference voltage $E_1$ according to the cutting tool position as determined by the tool position potentiometer 32 which is connected from the amplifier output to the system common connection. The slider is connected through a resistor 39 to the amplifier input.

At maximum billet diameter, $E_0=E_1$, and as the cutting tool 26 reaches ½ and ⅓ maximum diameter, $E_0=2\times E_1$ and $E_0=3\times E_1$ respectively. The speed regulator control voltage $E_0$ is similarly determined for other billet diameter values and thus is inversely proportional to the decreasing billet diameter so that the spindle speed is appropriately maintained for constant surface cutting speed.

A motor driven variac 40 is connected (not indicated) in the rectiflow wound motor secondary for the purpose of controlling the rectiflow acceleration from zero speed to base or higher starting cutting speeds (such as 600 r.p.m. or more), and the speed regulator 34 is most effective in controlling the spindle speed from the base or higher starting speed to synchronous speed (such as 1800 r.p.m.). The tool 26 is located against the workpiece 18 as the rectiflow is accelerated from zero speed to the starting cutting speed, by which it is meant to refer to the spindle speed at which a preselected constant surface cutting speed is realized. The higher starting or restarting speeds are required for smaller billets and for partially worked maximum size billets. With the variac and speed regulator control, high starting torque and adequately low starting inrush current are realized as the rectiflow drive is brought to the starting cutting speed.

To effect rectiflow speed control as described, the input speed reference voltage $E_1$ is tapered during the start-up acceleration and held constant after the base or starting speed is reached. Thus, a speed reference potentiometer 42 is connected in tandem with the variac 40, and the slider of the potentiometer 42 produces the input speed reference voltage $E_1$. Potentiometers 44 and 46 are connected across the variac 40 with junction 48 connected to the system common. In turn, the speed reference potentiometer 42 is connected across the potentiometers 44 and 46 so that during the variac travel period the voltage $E_1$ starts at a positive potential and proceeds through 0 to a negative potential.

Figure 5:
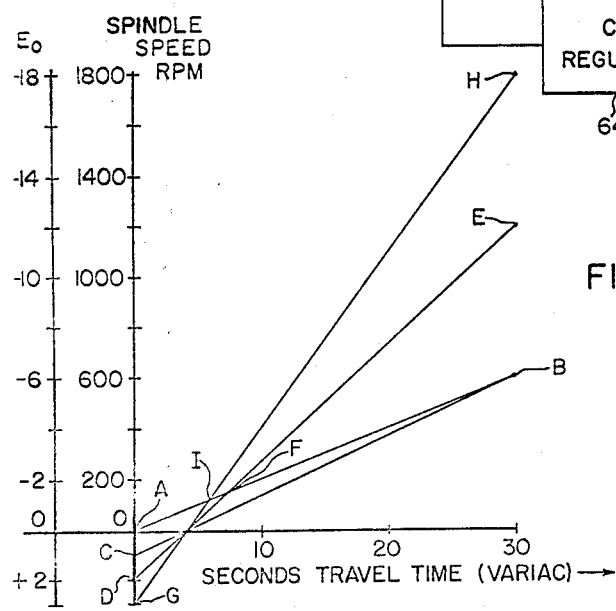
FIG. 5 illustrates operating curves related to the spindle drive control of FIG. 2.

The combined operation of the variac 40 and the speed regulator 34 under startup conditions is illustrated in the operating curves of FIG. 5. In these curves, it is assumed that a change of 1 volt in the speed reference voltage produces a change of 100 r.p.m. in the spindle speed. The curve AB illustrates normal full DC field acceleration of the rectiflow to a base speed of 600 r.p.m. With a full, or maximum diameter billet, the speed reference potentiometer 42 produces a varying reference voltage $E_1$, for example from +1 volt to -6 volts, and spindle speed increases at full field along the curve AB. At the point B, the speed reference voltage $E_1$ is constant and the multiplier 36 and the speed regulator 34 operate as previously described to maintain constant surface cutting speed.

If the billet is started at one-half maximum diameter, the tool position potentiometer 32 causes the speed reference voltage $E_0$ to be equal to 2E, or equal to +2 volts at point D. To attain the preselected constant surface cutting speed for the half diameter billet, the spindle drive must accelerate to the point E and the curve DE thus forms the associated reference voltage line. Thus, the drive 20 accelerates at full field along line AB to intercept point F and then along the curve DE to the point E at the end of the variac travel time. Speed regulator control is gradually effected during the acceleration period associated with other starting billet diameters in a similar manner. For example, speed regulator curve GH with intercept I corresponds to a billet having one-third of the maximum starting diameter.

In the apparatus 10, the strip 24 is produced or gathered by the tool 26 as the spindle rotates the billet 18 at constant surface cutting speed, and the strip 24 is transported over a crown roll 50 which rotates because the strip 24 is held in tension as it is coiled on a reel 52. If desired, the strip 24 can be passed through shaping rolls (not shown) after coiling. The shaping operation simply smooths out the fine roughness characteristically produced on one of the strip surfaces by the gathering action of the tool 26. Gauge reduction preferably is not involved in the shaping operation since the strip 24 is formed with highly uniform and accurate gauge.

The reel 52 is operated by a well-known reel drive 54 such as a motor 56 (FIGS. 3 and 4) controlled by a generator 58. Basic strip product quality control and particularly gauge control are produced by controlling an intermediate system variable, preferably the strip tension. Since reel torque determines the strip tension, a current controller 60, such as a transistorized DC operational amplifier, is employed for controlling the generator field current and in turn the reel motor current. The current controller 60 is preferably a proportional plus integral (PI) amplifier which produces an output with essentially a zero error input. A predetermined current reference set point 62 is applied as one input to the current controller 60 and a motor current feedback signal from a motor circuit resistor 64 is applied as another current controller input.

As subsequently explained more fully, it is preferred that gauge control be produced by strip tension regulation at a generally constant tension value subject to changes in certain significant system operating variables. Thus, the current controller 60 regulates for generally constant motor current, and a standard CEMF regulator 64 is responsive to armature voltage and current signals and a strip speed signal from tachometer 65 to control the motor field and maintain generally constant strip tension as the strip coil builds up during the system operation. In particular, as the motor armature voltage tends to drop as the reel torque arm increases at constant motor current, the motor field is increased in strength to maintain a constant counter electromotive force and constant armature voltage. The torque per ampere characteristic of the motor 56 thus increases as the reel speed decreases with generally constant strip tension.

Figure 4:
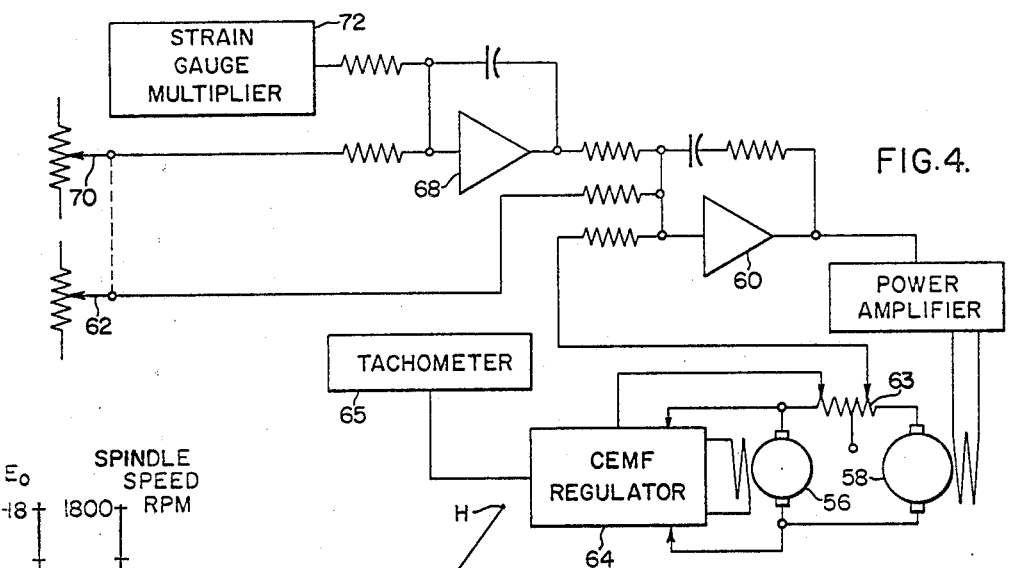
FIG. 4 shows a schematic diagram of another embodiment of a control for the reel drive.

In the embodiment of the invention shown in FIG. 4, the current controller operation is continually recalibrated to maintain constant strip tension even though the windup drive reel system losses of windage and friction and the like decrease with decreasing reel speed and increasing coil buildup. Without compensation or recalibration, the strip tension would vary with variation in the reel drive losses under constant reel motor current control.

Current controller compensation is provided by a tension controller 68, such as a standard DC transistorized operational amplifier, which has its output coupled as an input to the current controller 60. A tension reference setpoint 70 is applied to the input of the tension controller 68 for comparison with a tension feedback signal from a multiplier circuit 72 (FIG. 1). The multiplier 72 includes a strain gauge coupled to the reel shaft for reel torque measurement and, in addition, a suitable device for developing a signal proportional to the coil diameter. The product of the reel torque signal and the coil diameter signal is a signal proportional to the strip tension. When error develops between the preset tension setpoint and the actual strip tension, the tension controller 68 causes the current controller 60 to regulate the motor current to a new value which corrects the strip tension to the predetermined setpoint value. The current and tension setpoint potentiometers 62 and 70 preferably are connected in tandem so that the setpoint signals are simultaneously set for convenience. Since changes in strip tension due to changes in reel drive system losses are relatively slow, the control of FIG. 4 is characterized with a high degree of stability. Strip gauge control is improved over that realized with constant motor current and constant CEMF control alone.

Figure 3:
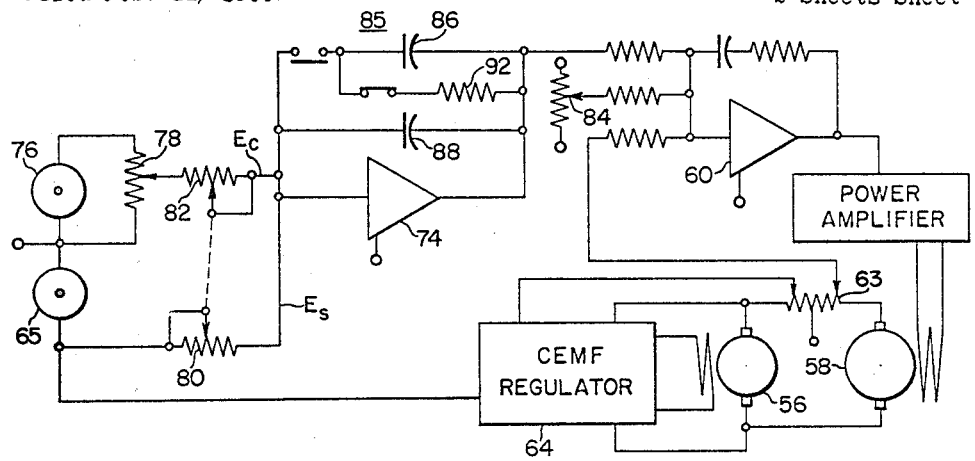
FIG. 3 shows a schematic diagram of a preferred embodiment of a reel drive control employed in the system of FIG. 1.

In the preferred embodiment of FIG. 3, strip tension is controlled to hold the gather ratio (previously defined) substantially constant. Thus, a ratio controller 74, such as a standard DC transistorized operational amplifier, produces a signal at the input of the current controller 60 to vary the reel motor current for tension control resulting in a substantially constant gather ratio. A constant surface cutting speed of the billet 18 and constant tool feed rate facilitate the realization of substantially constant gather ratio by means of strip tension control. With gather ratio control, the effects of all primary and intermediate system variables, such as tool cooling rates, tool wear, and changing reel drive losses, are controlled so that high quality and highly accurate gauge strip product is formed. Although strip gather ratio control can possibly be based on other schemes such as tool feed rate control (not shown) or surface cutting speed control (not shown), tension control is preferred since it is believed to be the most practicable scheme.

To produce a gather ratio feedback error signal for the ratio controller 74, a surface cutting speed signal $E_c$ and a strip speed signal $E_s$ are generated. A tachometer 76 generates a voltage proportional to spindle speed which is applied across a separate resistance and slider unit 78 of the cutting tool position potentiometer 32. The signal $E_c$ produced at the slider of the potentiometer unit 78 remains substantially constant as the spindle speed increases with decreasing cutting tool radial position.

The strip speed signal $E_s$ is directly obtained from the crown roll tachometer 65 and applied to a potentiometer 80 at the input of the ratio controller 74. Similarly, the surface cutting speed signal $E_c$ is applied to a potentiometer 82 at the input of the ratio controller 74. The potentiometers 80 and 82 preferably are connected in tandem so that the desired reference gather ratio can be preset at any value within a predetermined range of values. Thus, potentiometers 80 and 82 can be provided with a dial which is calibrated in units of gather ratio. Increasing the gather ratio of surface cutting speed to strip speed results in heavier gauge strip whereas decreasing the gather ratio results in lighter gauge strip. To increase the gather ratio, the slider arms of the potentiometers 80 and 82 are simultaneously moved to the left of FIG. 3, and the opposite direction of slider arm movement results in decreasing the gather ratio.

In operation, an error signal generated at the input of the ratio controller 74 results in an integrated output signal at the input of the current controller 60 so as to change the reel drive motor current to an extent necessary to change the strip tension for reestablishment of the preset gather ratio and removal of the gather ratio error signal. In this instance, the setpoint reference signal for the current controller 60 is a reference which can be calibrated in units of tension or units of current as indicated by the reference character 84. Thus, a change in any system operating variable which tends to produce a change in the gather ratio is offset by operation of the ratio controller 74 through the current controller 60. For example, a change in strip tension due to decreased reel drive losses at reduced reel speed but at continued constant reel motor current results in a changed gather ratio which effects a change in the reel motor current through the ratio and current controllers 74 and 60 so as to change the strip tension and return the gather ratio to the desired value. Similarly, increasing cutting tool wear or dullness tends to increase the gather ratio but operation of the ratio controller 74 through the current controller 60 results in increasing strip tension to the extent necessary to maintain a constant gather ratio.

It is also preferred that an acceleration compensation circuit 85 including a capacitor 86 be connected in parallel with normal feedback capacitor 88 in the gather ratio controller 74. The capacitor 86 increases the time constant of the gather ratio controller 74 when normally open logic contact 90 is closed. A discharge resistor 92 is provided in parallel with the capacitor 86 when normally closed logic contact 94 completes the discharge circuit. The contacts 90 and 94 are suitably controlled so that the capacitor 86 produces a longer time constant for the ratio controller 74 during the startup acceleration time of the mill spindle to the base or starting spindle speed. Strip tension thus increases gradually as the spindle is accelerated to prevent strip breakage during the startup acceleration period. After the startup acceleration period, the capacitor 86 is removed from the circuit by reopening of the contact 90 and the normal ratio controller time constant provided by the capacitor 88 then applies for operation of the control system as previously described.

The possibility of strip breakage during the startup acceleration period is due primarily to the fact that inherent gathering decreases at high surface cutting speed as compared to low surface cutting speed at a fixed cutting tool feed rate and at constant strip tension. To maintain the range of tension required for tight coil at higher cutting speeds, it is necessary that the cutting tool feed rate be set relatively high and the gather ratio setting at 80 and 82 be set accordingly. Thus, the cutting tool feed rate and the gather ratio setting are preset for a proper tension operating range at the higher cutting surface speed, and excessive strip tension demand after initial strip threading on the reel 52 and during the startup acceleration period is prevented by operation of the acceleration circuit 85. The first few turns of the strip on the reel 52 thus have heavy gauge, but this amount of off gauge strip is negligible.

Sample metal gathering apparatus having a 125 HP spindle drive has been operated and controlled in accordance with the principles of the invention to produce quality strip product having a gauge as small as three mils or less. For strip having a nominal gauge of ten mils, accuracy studies showed that gauge error was less than ±.05 mil. With suitable drive power, strip can be made in widths up to 12 inches or more at speeds up to 600 feet per minute or more depending on the workpiece material. Quality strip has been gathered from metallic materials such as copper, brass and stainless steel.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. A system for controlling strip gathering apparatus wherein a workpiece is located on a driven spindle for cutting tool penetration at a controlled rate so as to produce gathered strip on a driven windup reel, said system comprising means for controlling the spindle speed, means for controlling the reel drive, and means for controlling the ratio of the workpiece surface cutting speed to the strip speed.

2. A control system as set forth in claim 1, wherein said ratio controlling means regulates the surface cutting speed to strip speed ratio to a substantially constant value.

3. A control system as set forth in claim 1, wherein said reel drive controlling means operates the reel drive to produce generally constant strip tension, and said ratio controlling means is responsive to a signal representing the surface cutting speed to strip speed ratio to compensate said reel drive controlling means and to vary the strip tension for constant surface cutting speed to strip speed ratio.

4. A control system as set forth in claim 1, wherein said spindle speed controlling means controls the spindle speed to produce a substantially constant workpiece surface cutting speed with a substantially constant cutting tool feed rate, and said ratio controlling means regulates the surface cutting speed to strip speed ratio to a substantially constant value.

5. A control system as set forth in claim 4, wherein said ratio controlling means includes a ratio controller, means responsive to the spindle speed and the cutting tool position in relation to a predetermined reference and the strip speed for developing a surface cutting speed to strip speed ratio error signal input to said ratio controller, said reel drive controlling means responsive to said ratio controller to control the strip tension for substantially constant surface cutting speed to strip speed ratio.

6. A control system as set forth in claim 5, wherein said error signal response means includes spindle speed signal generating means and strip speed signal generating means and at least one ratio setting potentiometer coupled between one of said generating means and said ratio controller.

7. A control system as set forth in claim 5, wherein said reel drive control means controls the reel motor current at constant motor counter electromotive force so as to produce the strip tension control, the output of said ratio controller forming an input to said current controller.

8. A control system as set forth in claim 5, wherein means are provided for increasing the time constant of said ratio controller during spindle acceleration to a predetermined spindle speed.

9. A system for controlling strip gathering apparatus wherein a workpiece is located on a driven spindle for cutting tool penetration at a controlled rate so as to produce gathered strip on a driven windup reel, said system comprising means for controlling the spindle speed, means for controlling the reel drive; said reel drive controlling means including a current controller for maintaining substantially constant reel motor current at constant counter electromotive force, means for producing a signal representing strip tension, a tension controller responsive to an error signal developed from the strip tension signal and a tension reference signal, the output of said tension controller coupled to an input of said current controller to recalibrate the real motor current as the reel drive losses change.

References Cited

UNITED STATES PATENTS

| | | | |
|---|---|---|---|
| 1,701,889 | 1/1929 | Junker | 29—18 |
| 3,262,182 | 7/1966 | Duret | 29—18 |

RICHARD H. EANES, JR., *Primary Examiner.*